(12) United States Patent
Nagao et al.

(10) Patent No.: US 7,340,766 B2
(45) Date of Patent: Mar. 4, 2008

(54) SYSTEM AND METHOD FOR CONTROLLING A DIGITAL CAMERA PROVIDED WITH A WWW SERVER FUNCTION

(75) Inventors: Seiji Nagao, Tokyo (JP); Kazumitsu Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 767 days.

(21) Appl. No.: 10/226,205

(22) Filed: Aug. 23, 2002

(65) Prior Publication Data

US 2003/0043272 A1    Mar. 6, 2003

(30) Foreign Application Priority Data

Aug. 23, 2001 (JP) .............................. 2001-252732

(51) Int. Cl.
  H04N 7/173      (2006.01)
  H04N 5/225      (2006.01)
  H04N 5/232      (2006.01)

(52) U.S. Cl. ............... 725/105; 348/207.11; 348/211.1; 348/211.5; 348/211.8

(58) Field of Classification Search ................ 348/143, 348/156, 207.1, 207.11, 211.1, 211.2, 211.3, 348/211.4, 211.5, 211.6, 211.7, 211.8, 211.9, 348/211.11, 211.12, 211.13, 211.14, 211.99; 725/105

See application file for complete search history.

(56) References Cited

U.S. PATENT DOCUMENTS

| | | | |
|---|---|---|---|
| 5,323,393 A | | 6/1994 | Barrett et al. |
| 5,764,278 A | | 6/1998 | Nagao |
| 5,784,622 A | | 7/1998 | Kalwitz et al. |
| 5,838,368 A | * | 11/1998 | Masunaga et al. ....... 348/211.9 |
| 5,898,457 A | | 4/1999 | Nagao et al. |
| 6,385,722 B1 | * | 5/2002 | Connelly et al. ............... 713/2 |
| 6,567,122 B1 | * | 5/2003 | Anderson et al. ......... 348/211.3 |
| 6,701,058 B1 | * | 3/2004 | Tsubaki ....................... 386/46 |
| 6,882,361 B1 | * | 4/2005 | Gaylord .................. 348/207.1 |
| 2001/0055070 A1 | | 12/2001 | Watanabe |
| 2002/0178239 A1 | * | 11/2002 | Kinyon et al. .............. 709/220 |
| 2003/0037341 A1 | * | 2/2003 | Van Der Meulen ......... 725/143 |
| 2005/0002056 A1 | | 1/2005 | Lee |

FOREIGN PATENT DOCUMENTS

| | | |
|---|---|---|
| EP | 0 845 904 | 6/1998 |
| EP | 0 909 070 | 4/1999 |
| EP | 1 128 629 | 8/2001 |
| EP | 1 130 913 | 9/2001 |
| WO | WO 99/48276 | 9/1999 |

OTHER PUBLICATIONS

Ken Goldberg et al. "Desktop Teleoperation via the World Wide Web", IEEE International Conference on Robotics and Automation, May 19-26, 1995, Nagoya, Japan, pp. 1-6.

(Continued)

Primary Examiner—Lin Ye
Assistant Examiner—Dan Pasiewicz
(74) Attorney, Agent, or Firm—Oblon, Spivak, McClelland, Maier & Neustadt, P.C.

(57) ABSTRACT

A control system for digital camera makes it possible to control a digital camera from a personal computer and to operate the digital camera simultaneously from both of the digital camera side and the personal computer side by means of performing a communication between the digital camera on which a WWW server function is equipped and the personal computer having a WWW browser function.

27 Claims, 12 Drawing Sheets

OTHER PUBLICATIONS

Ken Goldberg et al. "Beyond the Web: Excavating the Real World Via Mosaic", Second International WWW Conference, Chicago, IL, Oct. 17-21, 1994, pp. 1-15.

Ken Goldberg et al. "A Tele-Robotic Garden on the World Wide Web", http://telegarden.aec.at/, pp. 1-2.

Patent Abstracts of Japan, JP 10-164421, Jun. 19, 1998.

* cited by examiner

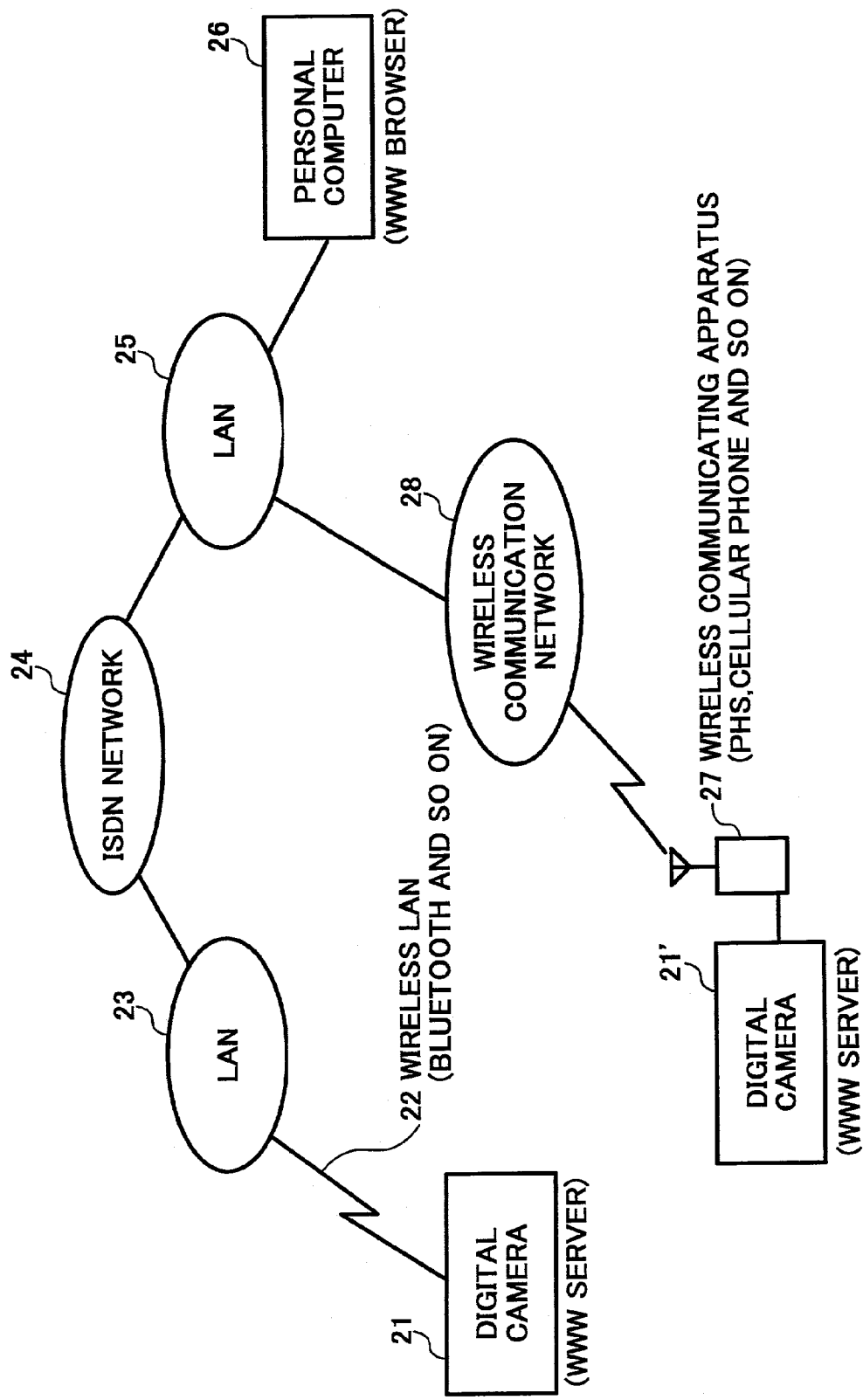

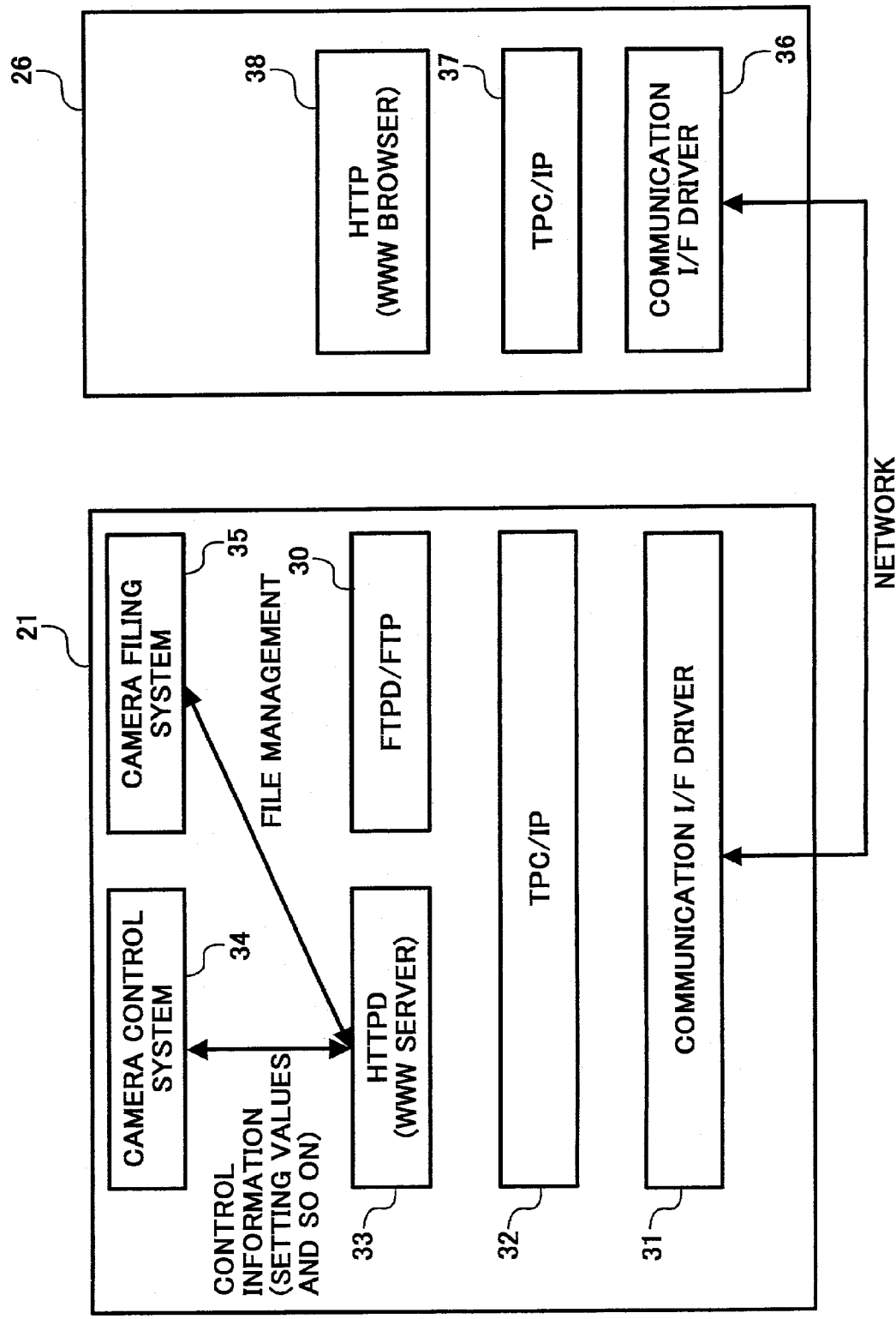

FIG. 4

| NPI REMOTE CONTROL |
|---|

☐ SET PHOTO-GRAPHING MODE   ☐ EXECUTE PHOTO-GRAPHING   ☐ EXECUTE CONTINUOUS PHOTO-GRAPHING   ☐ DISPLAY THUMBNAIL

RECORD INFORMATION

KIND OF MEDIUM

[BUILT-IN MEMORY ▼]

FOLDER INFORMATION

- 100RICOH / 4 IMAGES
- 200RICOH / 4 IMAGES
- 300RICOH / 4 IMAGES
- 400RICOH / 4 IMAGES
- 500RICOH / 4 IMAGES
- 600RICOH / 4 IMAGES

CLICK FOLDER NAME FOR DISPLAYING DETAILED DATA OF IMAGE

NPI   IMAGE INFORMATION

FOLDER NAME 100RICOH
4 IMAGES ARE DISPLAYED/
TOTAL 4 FILES

RIMG0001. JPG

| FILE NAME | : RIMG0001. JPG |
| PHOTOGRAPHER | : DAVID |
| PHOTOGRAPHED DATE & TIME | : 1998/08/20 3:14 pm |
| REMARKS | : MICHAEL |

RIMG0002. JPG

| FILE NAME | : RIMG0002. JPG |
| PHOTOGRAPHER | : JOHN |
| PHOTOGRAPHED DATE & TIME | : 1998/08/20 1:21 pm |
| REMARKS | : ALBERT |

RIMG0003. JPG

| FILE NAME | : RIMG0003. JPG |
| PHOTOGRAPHER | : WILLIAM |
| PHOTOGRAPHED DATE & TIME | : 1998/08/21 7:34 pm |
| REMARKS | : RICHARD |

SYSTEM AND METHOD FOR CONTROLLING A DIGITAL CAMERA PROVIDED WITH A WWW SERVER FUNCTION

BACKGROUND OF THE INVENTION

1. Field of the Invention

The present invention relates to a control system of digital camera and control method for the digital camera system, particularly relates to a control system and control method of a digital camera system in which a digital camera is provided with a WWW server function to be controlled remotely by a personal computer with a WWW browser function.

2. Description of the Related Art

The digital camera has been originated in a practical application from "MAVICA" (registered trade mark) as an electronic still camera made by SONY corporation which was released in about 1981 and it has been evolving. In this digital camera a charge coupled device (hereinafter refereed to as "CCD") is an important parts as a photographing device and higher performance and cost reduction of the CCD has been realized in progress.

The CCD is downsized as a high performance device with high density image characteristics and circulated in low cost accompanied with a progress of higher capacity and a downsizing of a card memory as a recording medium to store the photographed image data, and realization of semiconductor chip for JPEG which is a still image compression coding method.

As a result of this the recent digital cameras have been popularized equally to or much more than the conventional analog cameras. A web environment is also popped by recent development of the Internet in world wide mass scale, and an application program having a WWW browser function to view the home pages of Internet is attached in almost all personal computers. A backbone infrastructure with much higher transfer speed in the communication line for connecting apparatuses through Internet is also being facilitated.

It has been performed popularly that the image data photographed by a conventional digital camera we transferred to the personal computer which is connected to a network such as the Internet by a communicating function of the digital camera and a transferring process of the image data is controlled by the personal computer connected to the network by utilizing the digital camera in a communication state.

However, it is required the digital camera main body and a personal computer having the WWW server function to control the conventional digital camera by the WWW browser function of the personal computer. And also it is required the respective dedicated software programs which are different in every manufacturer and in every product item to control the digital camera from the personal computer side, and the software program must be attached in respective computers. Further there is a problem that the digital camera ma body cannot be operated in its side while the digital camera is controlled from the personal computer side.

SUMMARY OF THE INVENTION

Therefore an object of the present invention is to provide a control system for digital camera and a control method for the digital camera system by which the digital camera is made possible to be controlled by an apparatus having WWW browser function, and the digital camera is made possible to be used simultaneously by an operator of tie digital camera and an operator of the computing apparatus in remote location by means of the digital camera equipped a WWW server function, and by an arrangement that the photographed image data are deleted from a recording medium of the digital camera after the transfer of data to the designated destination are completed, it is made possible to reserve a sufficient free space in the memory means equipped on the digital camera so that the image data with much higher picture quality which requires more memory capacity can be obtained.

To attain the above described object a structure in accordance with a first aspect of the present invention provides a control system for digital camera or control method for the digital camera system including: a digital camera composed of a photographing means by which an image of object is photographed to obtain image data; a display means to display the image data; an image processing means by which respective process of recording/reproducing the image data to/from a recording media, and compression/decompression of the image data are performed, a communication means to connect to network; and a control means to control above described respective means, and computing apparatus in which a WWW browser function connected to the digital camera through network is included, in which: a WWW server function is equipped on the digital camera; a communication between the digital camera and the computing apparatus is performed through the communication means; and the digital camera is operable from the computing apparatus by the WWW browser function.

A structure in accordance with a second aspect of the present invention provides a control system for digital camera or control method for the digital camera system in which at least one of an operating means equipped on the digital camera and the WWW browser function of the computing apparatus which is connected with the digital camera through a network enables to operate the digital camera simultaneously from both of the digital camera side and the personal computer side.

A structure in accordance with a third aspect of the present invention a control system for digital camera in which while any one of an operation by the operating means of the digital camera side and an operation by the WWW browser function of the computing apparatus side is being executed, a control of an exclusive process which prohibits the operation by the other side is carried out.

A structure in accordance with a fourth aspect of the present invention a control system for digital camera in which an operation of the digital camera is made possible by means of other digital cameras having a WWW browser function or hand held terminal apparatus having a WWW browser function.

A structure in accordance with a fifth aspect of the present invention a control system for digital camera and control method for the digital camera system in which a state of the operating process by the digital camera is reflected to the computing apparatus and/or a state of the operating process by the computing apparatus is reflected to the digital camera.

A structure in accordance with a sixth aspect of the present invention a control system for digital camera and control method for the digital camera system in which a format of HTML document which includes photographed image data, thumbnail of the image data, data setting of the digital camera and control data of the digital camera, is used as a format of signal transferred between the digital camera and the computing apparatus in the communication between the digital camera and the computing apparatus.

A structure in accordance with a seventh aspect of the present invention a control system for digital camera and control method for the digital camera system in which data of a monitored image of object to be photographed before a picture is taken by the digital camera are transferred with a predetermined size of the image and a predetermined fame rate by the WWW server function which is equipped in the digital camera, and the monitored image data are received in the computing apparatus by the WWW browser function.

A structure in accordance with an eighth aspect of the present invention a control system for digital camera and control method for the digital camera system in which the size of image, an image compression rate and/or the frame rate of the monitored image when the monitored image data are transferred, are made possible to change from the computing apparatus side by the WWW browser function.

A structure in accordance with a ninth aspect of the present invention a control system for digital camera and control method for the digital camera system in which the size of image, the image compression rate and/or the frame rate of the monitored image when the monitored image data are transferred, e made possible to change according to a communication state of the network to connect the digital camera and the computing apparatus.

A structure in accordance with a tenth aspect of the present invention a control system for digital camera and control method for the digital camera system in which the image data photographed by the digital camera are deleted from a recording medium in which the image data are stored after the photographed image data are transferred though a communication means to a predetermined destination to be stored and the transferring process has been completed normally.

A structure in accordance with an eleventh aspect of the present invention a control system for digital camera and control method for the digital camera system in which a character data communication or an audio data communication is made possible between an operator of the digital camera side and an operator of the computing apparatus side both of which are connected with the network.

BRIEF DESCRIPTION OF THE DRAWINGS

The above and other objects, features and advantages of the present invention will become more apparent from the following description taken in connection with the accompanying drawings, in which:

FIG. 2 is a diagram to show an outline of structure of a digital camera control system in accordance with the embodiment of present invention;

FIG. 3 is a diagram to show an outline of structure of a program for digital camera control system in accordance with the embodiment of present invention;

FIG. 4 is a diagram to show an example of display screen which displays an image stored in a memory of the digital camera utilizing a WWW browser function;

FIG. 5(a) is a state transition diagram to show a state of an exclusive process when a command to change state is processed by the digital camera and FIG. 6(b) is a state transition diagram to show a state of exclusive process when a command to change state is processed by a personal computer;

DESCRIPTION OF THE PREFERRED EMBODIMENTS

Figure 1:
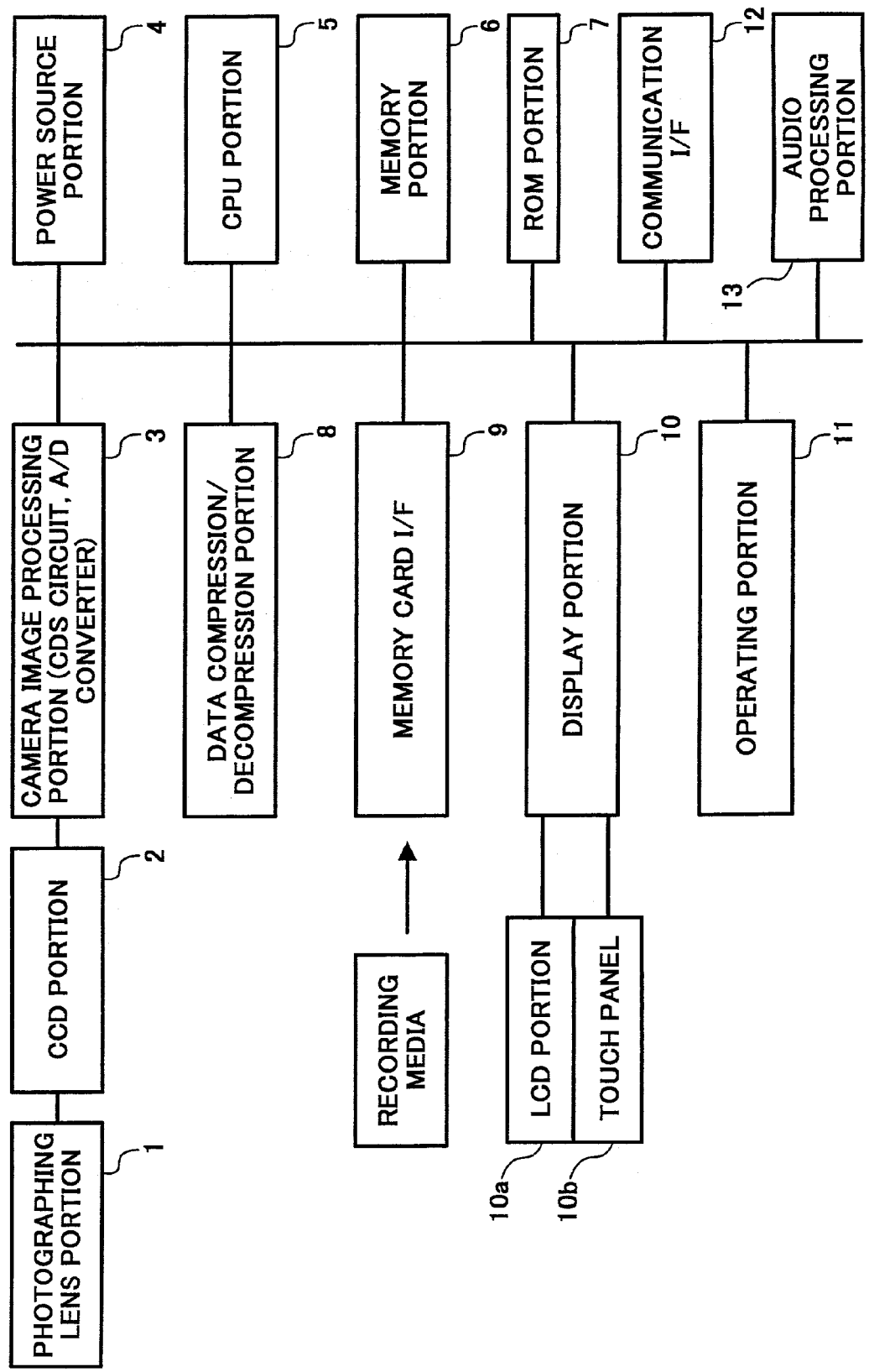
FIG. 1 is a block diagram to show an outline of structure of a digital camera in accordance with an embodiment of the present invention.

As shown in FIG. 1, the digital camera includes a photographing lens portion 1 which composes a photographing means. The photographing lens portion 1 comprises a lens unit, a filter portion, an automatic focusing (AF) unit, an iris mechanism, a shutter mechanism and so on, and the mechanical shutter in the shutter mechanism performs a simultaneous exposure for two fields (for example fringe section and central section). A CCD portion 2 (or a MOS type photographing device) as a photographing device converts an optical image which is input through the photographing lens portion 1 into an electric signal (analog signal) to obtain image data The digital camera includes a camera image processing portion 3. The camera image processing portion 3 includes CDS (Correlation Double Sampling) circuit to perform a noise reduction function for the CCD type photographing device, Analog to Digital converter to convert the analog signal input from the CCD portion 2 through the CDS circuit and so on into the digital signal to perform a conversion of the input analog signal to a digital form at the most optimized sampling frequency (for example an integral multiples of a subcarrier frequency of the NTSC signal), then achieves a white balancing, a color signal processing and so on.

The digital camera further comprises a power source portion 4 to supply electric power to various portions of the digital camera, a CPU portion 5 to control the whole apparatus, a memory portion (RAM) 6 to be utilized for program processed in the CPU portion 5, for setting data of various kinds of apparatus and for image data as a temporary memory and a working memory and a ROM portion 7 which stores a starting program used when the electric power for the apparatus is tamed on to be supplied The digital camera also includes a data compression/decompression portion 8. The data compression/decompression portion 8 performs a function as an image processing means to achieve data processing of various data processing, data correction and image compression/decompression for luminance signal data and color signal data which are separated from the photographed image data output from the camera image processing portion 3, as one example, the data compression/decompression portion 8 performs an orthogonal transformation/inverse orthogonal transformation and a Huffman coding/Huffman decoding which are processes of the image compression/decompression in compliance with the JPEG (Joint Photographic Experts Group) to achieve a moving image compression/decompression for JPEG image, character mode image, binary picture, AVI (Audio Visual Interleaved) and so on.

The compressed image data are stored in the memory portion 6 as a file or stored in a recording media, such as SD card, smart media, compact flush (Registered Trade Mark) and so on which is inserted in a memory card interface (hereinafter refereed to as "I/F")9.

A display portion 10 displays various kinds of mode, various kinds of error or monitored image on a LCD portion 10a which is connected thereto when photographing is achieved. When reproducing is achieved it displays image data which are photographed or displays thumbnails on the LCD portion 10a. Further the display portion 10 performs a control to transfer coordinate signals from a touch panel 10b to the CPU portion 5.

When in case the electric power is supplied to start up the apparatus in a photographing mode, the image data from the camera image processing portion 3 are output directly in the LCD portion 10a through the display portion 10 as a motion picture. In other words, the LCD portion 10a is made to be utilized as a view finder. At this point it may be possible for a structure in which the view finder is separately arranged though the drawing is not included, and an operator seeks a timing to release the shutter while viewing the LCD portion 10a.

In next an operating portion 11 includes various buttons to perform various settings of a selection of function, a direction of photographing and others from outside. As one example, it includes a shutter, a zooming key, a mode dial, a strobe light button, a macro button, menu keys for displaying a guidance in the LCD portion 10a to realize the selection of operating function, cursor keys of up, down, right and left, an ENTER key, a CANCEL key, a SELECT key, a power button for switching power on/off which are used for photographing and also a J button to record and reproduce a series of operations.

At this point tie above described various buttons are possible to be made to have another different function in every operation mode such as photographing, reproducing, communicating and so on, and more manifold functions may be assigned to every keys utilizing the touch panel 10b. The digital camera is operated according to the predetermined program by that a signal which is orated by pushing down the function button to be necessary is transferred and informed from the operating portion 11 to the CPU portion 5. Moreover, it may be possible for the touch panel 10b to be made to include a character input function which is the same as a key board utilizing in the usual personal computer.

A communication I/F 12 is an interface with various external communication apparatus, it may be made under, as one example, a PCMCIA (Personal Computer Memory Card International Association) which is one of standardized specification of a PC card spreading with a propagation of the note type personal computer. In the communication I/F 12, as one example, a modem card to be connected with GSTN (Global Switched Telephone Network), a TA (Terminal Adapter) card to be connected with ISDN network, a LAN (Local Area Network) card to be connected with LAN, a wireless communication card to be connected with cellar phone and so on can be applicable as PC card and these cards allows for the apparatus to be connected with the external communication apparatus.

Further the digital camera includes a strobe light portion (not shown) which has a function of condenser necessary to flush the strobe light and to controls the strobe light to be utilized in photographing at dark condition such as in night and an audio processing portion 13 which performs an audio compression function according to a predetermined format on an audio signal which is gathered by a microphone furnished on the digital camera to be stored in the memory portion 6 or in a recording media through the memory card I/F 9 or for the audio signal to be transmitted through the communication I/F 12. her when an error happens, the gather audio signal or audio signal received through the communication I/F 12 can be reproduced for the operator to be informed by means of audio signal through a speaker.

FIG. 2 is a diagram to show an outline of structure of a digital camera control system in accordance with the embodiment of the present invention. As shown in FIG. 2, the digital camera 21 is connected with a LAN 23 through a wireless LAN 22 (for example, wireless communication system utilizing Bluetooth), and further the digital camera is connected with a personal computer 26 which constitutes a LAN 25 disposed in remote location through an ISDN network 24 in a network connection. As for other example, the digital camera 21' is connected with a personal computer 26 which constitutes a LAN 25 disposed in remote location through a wireless communication apparatus 27 (for example a cellular phone or a personal handy phone) via a wireless communication network 28 in a network connection.

Hereinafter an operation of the control system for the digital camera in accordance with the embodiment of present invention will be described in detail with reference to FIG. 1 and FIG. 2. The CPU portion 5 controls the operations of respective portions of the digital camera 21 or executes processing of the image data according to the directions for operation from outside such as pushing down of buttons in the operating portion 11 or the touch panel 10b.

For example, the CPU portion 5 performs a control of operation to record an image data in a recording media, a control of operation to reproduce the image data stored in the recording media, a combining process of the image data, a correction process of the image data and so on. In other words, the CPU portion 5 takes charges of functions such as a recording control means, a reproducing control means, a reporting means, data processing means and so on.

An image displaying memory is equipped in the display portion 10, and the image displaying memory is composed with a plurality of planes as a logical structure. A control of the image displaying is performed by means of a superposition and a combination of the respective planes, and accordingly the image to be displayed is displayed on the LCD portion 10a by the process above described. When the image is superposed a displaying position, a displaying magnification, luminance of image, a transparent attribute and so on are controlled in the respective planes.

At this point the digital camera 21 further may have a function directly to transmit and to receive image data by means of a connection to the communication I/F 12 with the LAN card to be connected with the LAN 23 or by means of a furnishing USB (Universal Serial Bus) as an external apparatus connection I/F (not shown) to be connected with the personal computer. Further by a connection to the digital camera 21' with a wireless communication apparatus 27 as an I/F module such as a cellular phone or a personal handy phone, the digital camera may have a function to perform transmitting and receiving Electronic mails (E mail) and data files through a network (World Wide Web) via a wireless communication network 28. Also the digital camera may have a function to perform direct transferring and receiving image data with another digital camera, with other apparatuses which are in compliance with Bluetooth, with other personal computers by mean of utilizing the Bluetooth module as the wireless LAN 22.

FIG. 3 is a diagram to show an outline of structure of a program for digital camera control system in accordance with the embodiment of present invention. On the digital camera 21 a communication I/F driver 31 to operate the various kinds of communication cards (for example, the modem card, the TA card, the LAN card, the wireless communication card and so on) to be inserted into the communication I/F and a TCP/IP 32 (the standard protocol for World Wide Web) which is a standard communication protocol for these cards in upper layer, are equipped.

At this point on the personal computer 26, a communication I/F driver 36 to operate the various kinds of communication cards (for example, the modem card, the TA card, the LAN card, the wireless communication card and so on) to be inserted into the communication IF a TCP/IP 37 (the standard protocol for the World Wide Web) which is a standard communication protocol for these cards in upper layer, and an http (Hyper Text Transfer Protocol) 38 which is a file transferring protocol between the server/clients as a WWW browser function are equipped. Also on the digital camera 21 a httpd (Hyper Text Transfer Protocol Daemon) 33 is equipped which is the WWW server function to operate as a server, a various kinds of HTML (Hyper Text Markup Language) documents are stored in it.

The various kinds of HTML documents are transferred to the personal computer 26 side by the digital camera 21 on the basis of URL (Uniform Resource Locators) directed by the http 38 of personal computer 26.

At this point on the digital camera 21 side a camera filing system 35 to perform accessing to a file in the memory portion 6 as a self contained memory or an external memory, and a camera control system 34 including an API (Application Program Interface) to perform setting of various kinds of parameters of the digital camera 21 and to perform the photographing operation such as a shutter releasing action, are prepared. As one example, the shutter releasing action in the above described program is performed in the server side which has the httpd 33, i.e. the digital camera 21 side by means of a direction from the WWW browser function, or by means of pushing down a radio button of the shutter release which is displayed on the display screen of the personal computer 26 by a direction from the WWW browser function utilizing a CGI (Common Gateway Interface) as a well known technology from the personal computer side.

At a point when a photographing process has been completed, an HTML document on which a still image is attached is sent to the WWW browser function side. By this operation the image data which were photographed are allowed to be seen and confirmed by means of the WWW browser function in the personal computer 26 side.

Further utilizing this WEB environment a voice conversation or an exchange of message utilizing character symbols which is called "chat" can be performed between the operator of the digital camera 21 and the operator of the personal computer 26 by means of the above described audio processing portion and the touch panel both are equipped in the digital camera 21.

FIG. 4 is a diagram to show au example of display screen which displays an image stored in a memory of the digital camera utilizing a WWW browser function on the display screen of personal computer 26. In this example the image data are generated in a form of the HTML document as a file viewer to display the photographed image data and the file is transferred to the personal computer 26 side. By this operation the operator can display the files (image data) which are stored in the digital camera on the display screen of personal computer 26 by means of the ordinary WWW browser function (Netscape Navigator: registered trade mark, Internet Explorer: registered trade mark, and so on). An information on name of photographer and/or day and time of photographing can be added to the HTML document as a tag of the file in the digital camera 21.

In the control system for the digital camera in accordance with the embodiment of present invention, it is made possible to control the operation of digital camera 21 by means of the WWW browser function of personal computer 26 as well as by the operator of digital camera 21. Because the control operation from the personal computer 26 side inevitably includes a time delay caused by the network, there is a possibility of occurrence of a discrepancy in the state between the digital camera and the personal computer 26, the exclusive processes are required in respective unit of operation in the process. At this point the operation from the digital camera 21 side is reflected on the digital camera as a main body and then it is reflected on the display screen of personal computer 26 which performs a linked operation in remote location with the display portion 10 of digital camera 21 as well as the operation from the personal computer 26 side is reflected on the digital camera side. Moreover, the operations caused by the remote control from the personal computer 26 side has the same functions as the various operations of the digital camera 21 main body such as photographing and reproducing.

At this point the image data photographed by the digital camera 21 are made to be possible to confirm on the personal computer 26 side by means of the WWW browser function, the image data are also made to be transferred as the file data to a folder of the other specified personal computer by an ftpd/ftp 30 when it is set beforehand. When in a case the destination of transfer is a file server which is connected with the other network, the file transferring can be performed with an ftp (File Transfer Protocol). Further in accordance with the present invention the operations of digital camera 21 are made to be possible to be performed by another digital camera, a PDA (Personal Digital Assistant), a cellular phone and so on which are connected through a network including the WWW browser function.

Figure 5A:
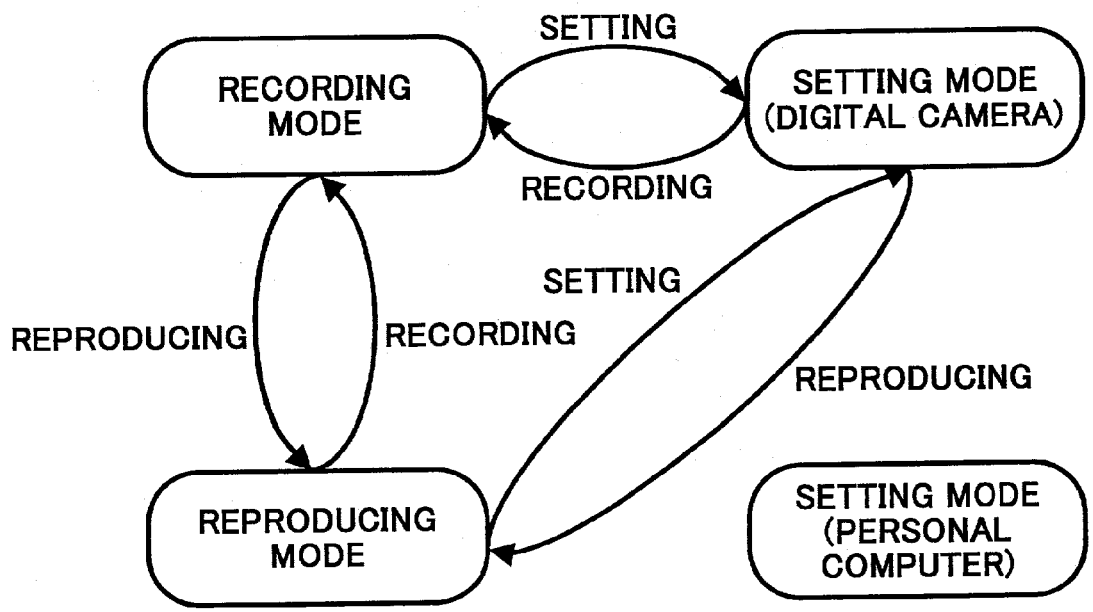
Figure 5B:
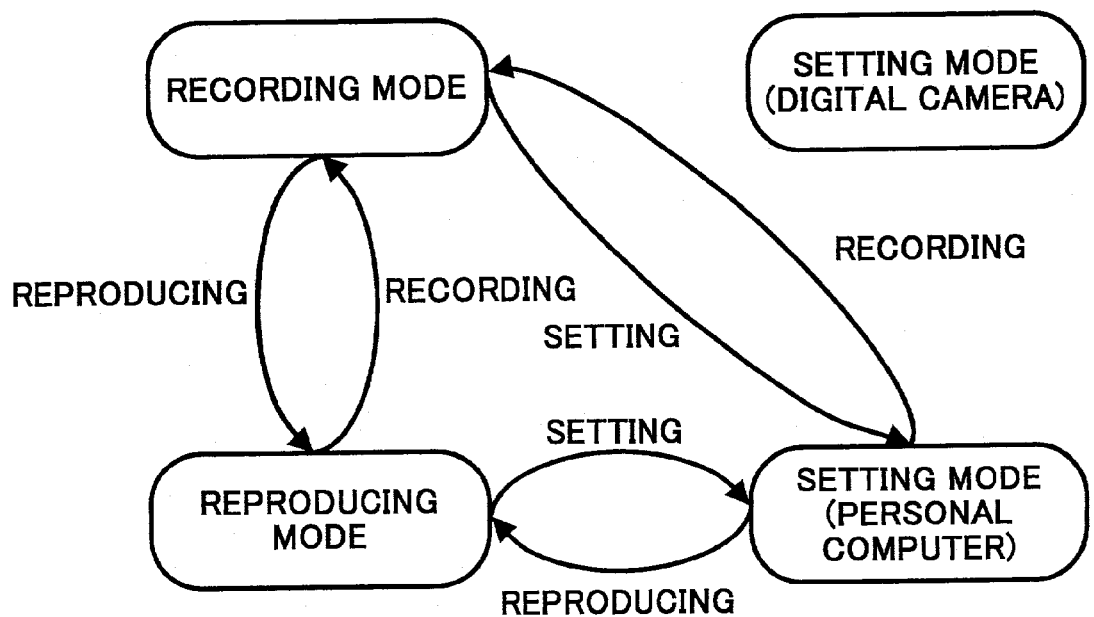

Herein FIG. 5(*a*) is a state transition diagram to show a state of the exclusive process when a command to change state is processed by the digital camera 21 and FIG. 5(*b*) is a state transition diagram to show a state of exclusive process when a command to change state is processed by a personal computer 26. As shown in FIG. 5(*a*) and FIG. 5(*b*) there are states of a recording mode, a reproducing mode, a setting mode (at digital camera) and a setting mode (at personal computer).

The recording mode and the reproducing mode in FIG. 5(*a*) and FIG. 5(*b*) are made it possible to be performed by a command from any one of both of the digital camera 21 and the personal computer 26. When the system is in a state of the setting mode (at digital camera) which is specified by an operation of the digital camera 21, the personal computer 26 is made to impossible to control the digital camera 21 till the state moves to the recording mode or to the reproducing mode by the operation from the digital camera 21 itself.

When the system is in a state of the setting mode (at personal computer) which is specified by an operation of the personal computer 26 as well, the digital camera 21 is made to impossible to control the digital camera 21 itself till the state moves to the recording mode or to the reproducing mode by the operation from the personal computer 26 or till the network connection between the two is shut down.

Figure 6:
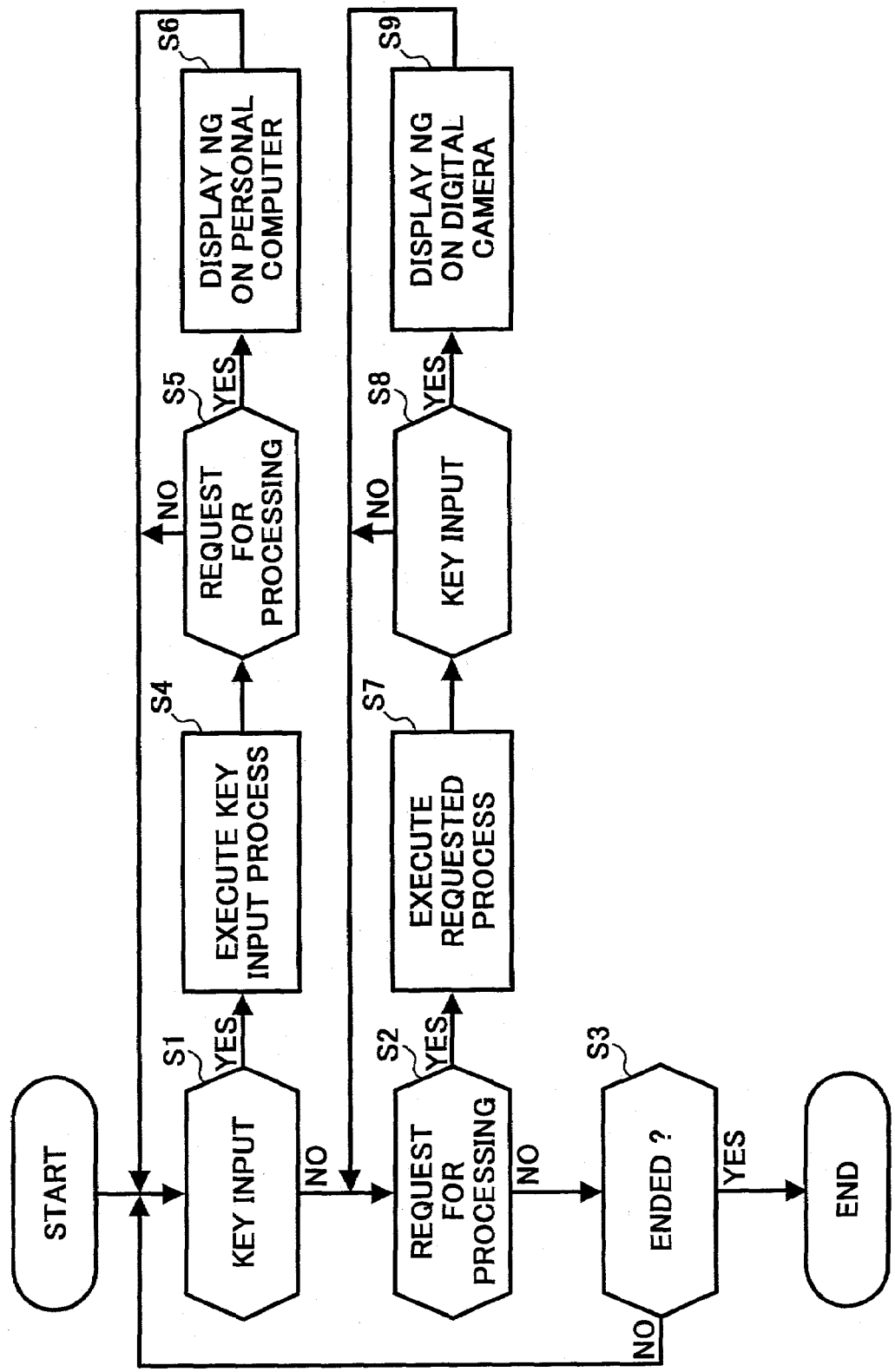
FIG. 6 is a flow chart to show an operation of the exclusive process of a control system for the digital camera in accordance with the embodiment of present invention.

FIG. 6 is a flow chart to show an operation of the exclusive process of the control system for the digital camera in accordance with the embodiment of present invention. As shown in FIG. 6 a confirmation whether a key input to the digital camera 21 by the operator of the digital camera main body is received or not, is achieved (S1), when the key input is not confirmed (the result is "No" at S1), further a confirmation whether a request for any processing from the personal computer 26 or not, is achieved (S2), when the request is not confirmed (the result is "No" at S2), further a confirmation whether a termination of key input or a termination of request for any processing is received or not, is achieved (S3), when the termination is confirmed (the result is "Yes" at S3), the exclusive process is completed, if the termination is not confirmed (the result is "No" at S3), and the process flow is returned to the first step S1.

At the step S1 of process when the key input from the digital camera 21 main body is confirmed (the result is "Yes" at S1), a process designated by the key input is performed (S4). At this point the confirmation whether the request for any processing from the personal computer 26 or not, is achieved (S5), when the request is not confirmed (the result is "No" at S5) and the process flow is returned to the first step S1. When the request is confirmed (the result is "Yes" at S5) an error signal is returned to the personal computer 26 which requested the process to inform the request is not acceptable (S6) and the process flow is returned to the first step S1.

As the same as above description, at the step S2 of process when the request for any processing from the personal computer 26 is confirmed (the result is "Yes" at S2), the process designated by the request is performed (S7). At this point the confirmation whether the key input from the digital camera 21 main body is input or not, is achieved (S8), when the key input is not confirmed (the result is "No" at S8), the process flow is returned to the process step S2, when the key input is confirmed (the result is "Yes" at S8), an error signal is displayed on the display portion of digital camera 21 to inform the key input is not acceptable (S9) and the process flow is returned to the process step S2.

For example, if in a case the key operation is continuously necessary to perform the process such as by the zoom key operation, a process by the key operation from the digital camera 21 main body and a process requested by the personal computer 26 are not performed at the same time. In such case while a process designated by one of them is performed, an error signal is returned to the other side which request the other process to inform the requested process is not acceptable because the exclusive process is performed.

Figure 7:
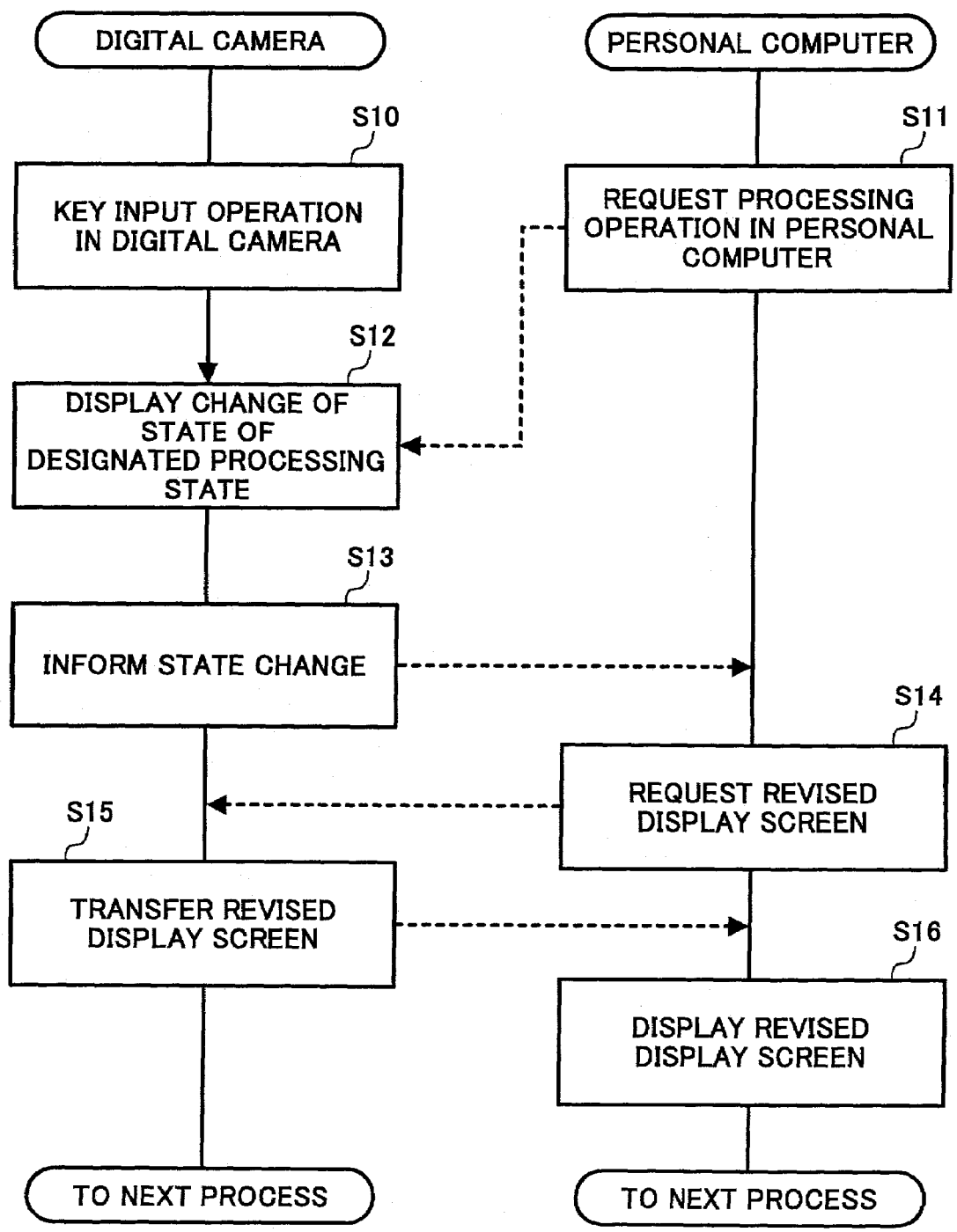
FIG. 7 is a flow chart to show an updating process displaying a revised content which is changed by a command from one of the digital camera or the personal computer in the exclusive process of the embodiment of present invention.

When any one of tie various kinds of settings for the digital camera 21 is changed by an operation from one side of the digital camera 21 or the personal computer 26 and any operation from the other side is not accepted by the exclusive process, a notice of contents of the various kinds of settings which were changed by the other side is performed by a display of the contents of various kinds of the settings which were changed on the display screen of personal computer 26 and the display portion of digital camera 21 respectively. FIG. 7 is a flow chart to show an updating process displaying a revised content which is changed by a command from one of the digital camera or the personal computer in the exclusive process.

As shown in FIG. 7 when there is a change of state such as the settings and so on by the key input operation from the digital camera 21 main body (S10) or by the request for processing from the personal computer 26 (S11), the state is changed according to the designated operation to the digital camera 21 and the change of state is displayed on the display portion 10 on the digital camera 21 (S12).

Moreover, the change of state is informed to the personal computer 26 (S13). The personal computer 26 requests a display screen which is corresponding to the changed state (S14), and the display screen corresponding to the changed state is transferred from the digital camera 21 (S15), then the display screen with the revised state is displayed on the personal computer 26 (S16).

Figure 8:
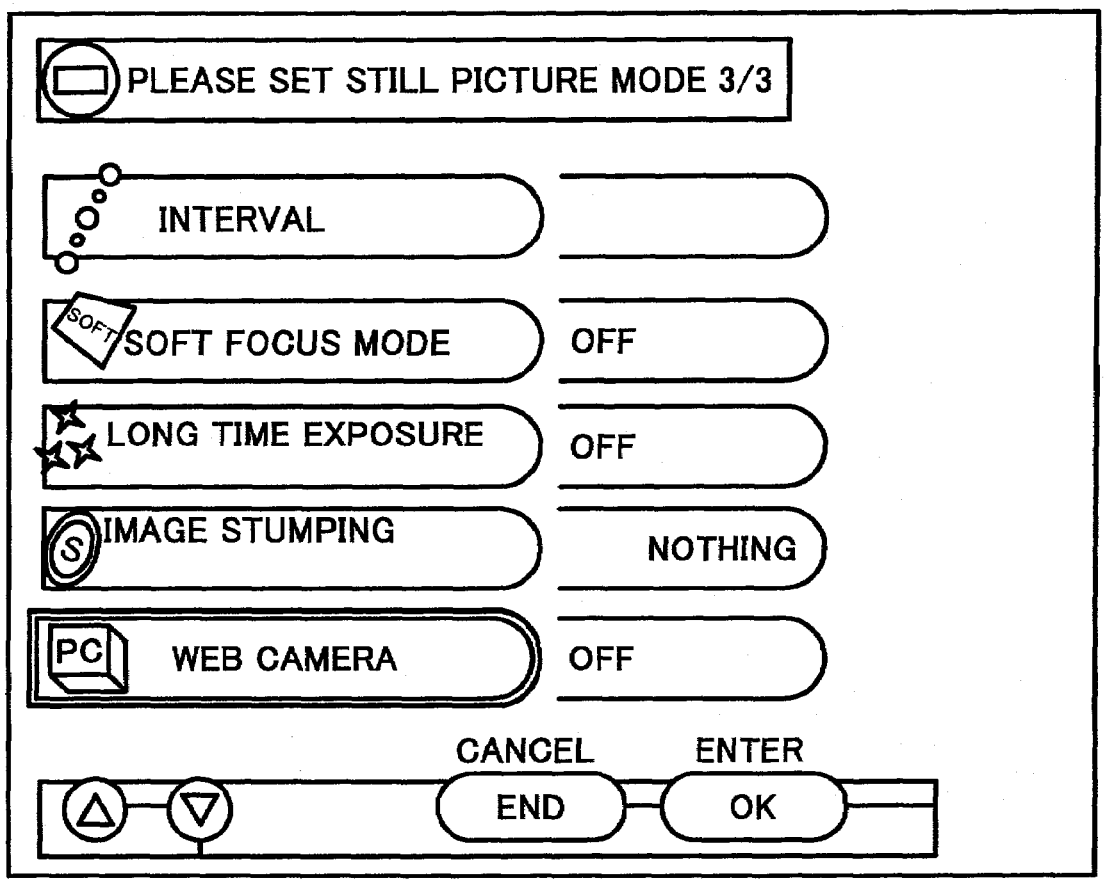
FIG. 8 is a diagram to show an example of display screen of the digital camera displaying a photographing menu in accordance with the embodiment of present invention.

Hereinafter concrete operation of the control system for the digital camera in accordance with the embodiment of present invention will be described. At first when a power source of the digital camera 21 is turned on, a menu for photographing which is shown in FIG. 8 is displayed on the display portion 10 on the digital camera 21. At this point when an item "WEB camera" is selected on the menu, a httpd function, in other words, a WWW server function of the digital camera is booted up in addition to the usual operation to execute the photographing operation by the digital camera.

In this state not only by the operator of digital camera 21, but also by any operator in remote location the digital camera 21 is made it possible to be operated by means of the WWW browser function of any personal computer 26 which is connected through the network.

Figure 9:
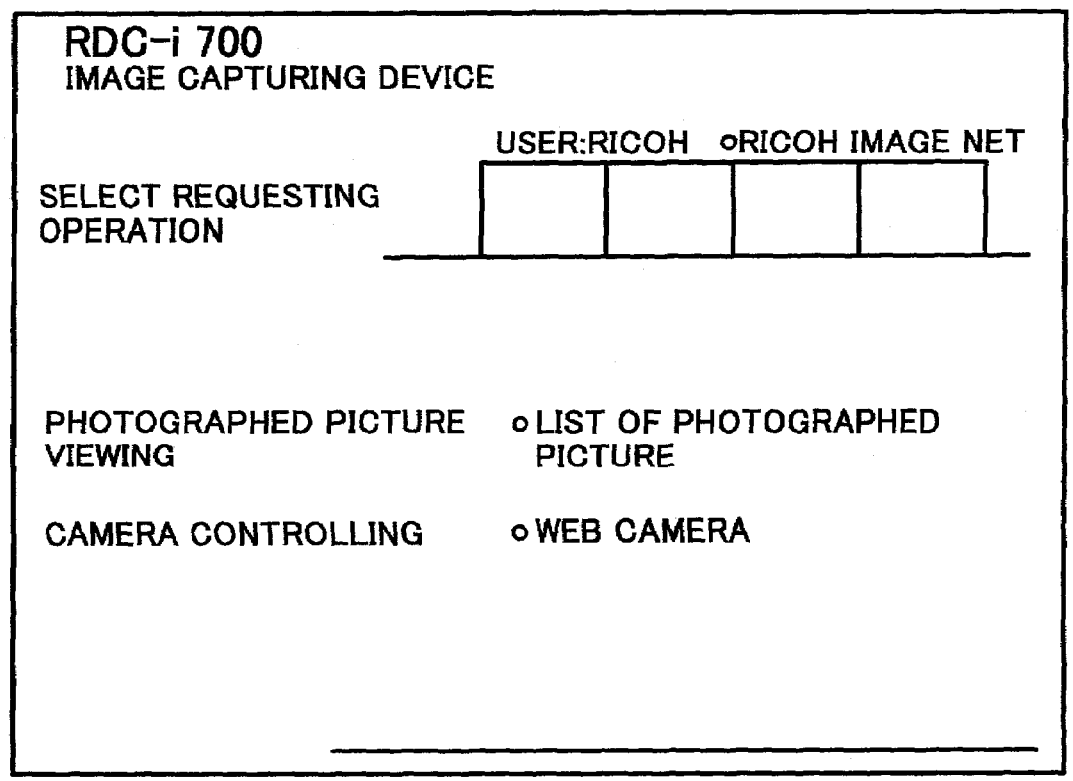
FIG. 9 is a diagram to show an example of initial screen which is displayed on the personal computer in accordance with the embodiment of present invention.

When a predetermined URL of the digital camera 21 is transmitted by the WWW browser function of personal computer 26, the WWW server function of digital camera 21 on which the URL is set is responded, and an initial display screen of the HTML document as shown in FIG. 9 is transferred to the personal computer to be displayed. Further the digital camera is ready to receive new request which will be transferred from the WWW browser function.

As an example, a transferring of request to the digital camera 21 side is achieved by pushing down a confirmation button to achieve photograph (or by selecting icon and clicking by means of a mouse) in the initial display screen shown in FIG. 9, then in the digital camera 21 side a photographing is performed and a HTML document with which the photographed image data are attached is transferred to respond the request. In the personal computer side tie transferred HTML document is received to be displayed by the WWW browser function.

Figure 10:
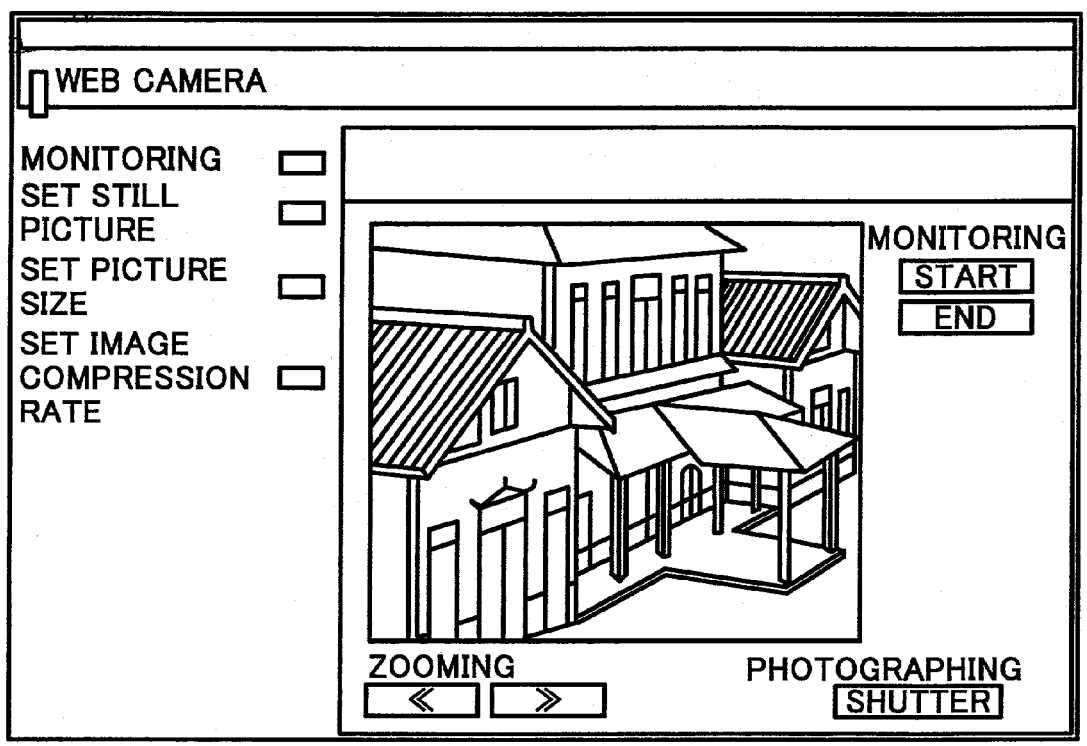
FIG. 10 is a diagram to show a state in which an sample of monitoring (large) of an object to be photographed is displayed by the personal computer before a picture of the image is taken by the digital camera.
Figure 11:
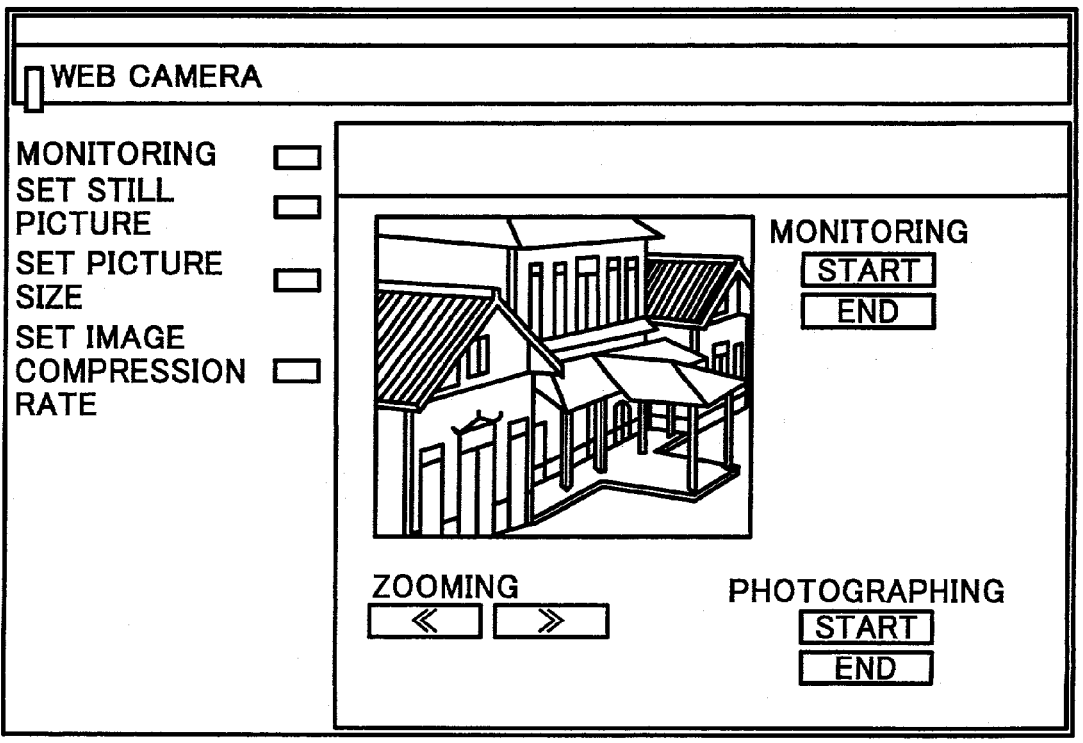
FIG. 11 is a diagram to show a state in which a sample of monitoring image (small) of an object to be photographed is displayed by the personal computer before a picture of the image is taken by the digital camera.

FIG. 10 and FIG. 11 are the diagrams respectively to show an example of display screen of the image that an image of object to be photographed is monitored before a picture of the image is taken by the digital camera 21 by means of the WWW browser function of personal computer 26. The monitored image by the digital camera 21 is formed in the steps that a photo image gathered by the photographing lens portion 1 is transformed in electrical image signal by the CCD portion 2 and then it is converted by an analog/digital (AID) conversion by the camera image processing portion 3 in a predetermined format, and it is displayed usually in a predetermined frame rate on the LCD portion 10a of display portion. Because it is not actual photographed image, the monitored image is displayed on the LCD portion 10a in real time in which the dimension of size of picture is not so much large as three millions (3,000,000) or two millions (2,000,000) of pixels, it is usually a small size in degree of such as 160 by 120 dots (160×120) only enough to display on the LCD portion 10a. The monitored image data by the digital camera 21 is transferred as the HTML document by the WWW server function of the digital camera 21 to the WWW browser function of personal computer 26 to be displayed.

As an example, the monitored image data are transferred from the digital camera 21 to the personal computer 26 in a predetermined frame rate such as one time per one second (1/sec). In the personal computer 26 side which receives this image data, the monitored image data are made to be displayed in real time from the remote location.

The digital camera 21 and the personal computer 26 are connected by a network through a various kinds of interface. As one example, a baud rate in degree of 38.4 kBPS can be obtained when in a case an analog modem is utilized. When in a case the ISDN is utilized, a baud rate in degree of 64 kBPS can be obtained. Further when in a case the LAN is utilized, a baud rate over 1 MBPS can be obtained. As above described, because the transfer rate is made different by the environment of communication the data amount to be transferred must be considered for the transferring/receiving of monitored image data by which only the outline appearance of image of the object to be photographed is required.

Figure 12:
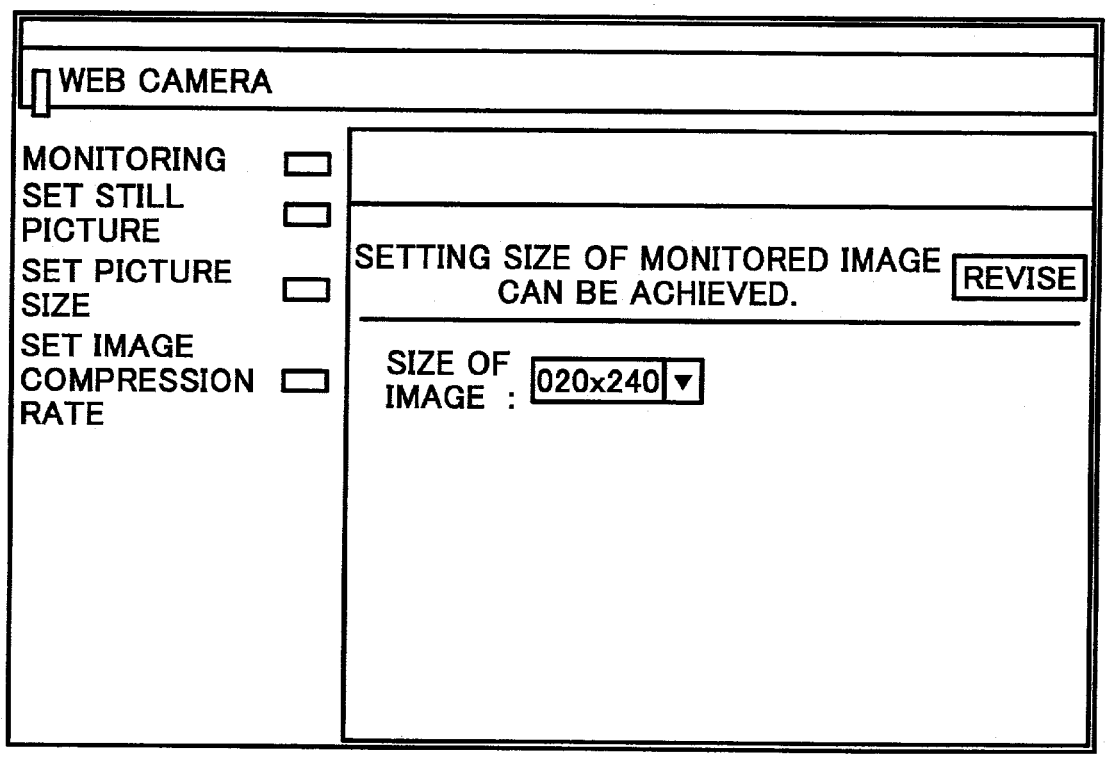
FIG. 12 is a diagram to show an example of setting display screen to select gm image size of monitoring image of an object to be displayed by tie personal computer.

An example of setting screen for the size of image to be photographed which is selected from a still image of monitored image, a size of monitored image, a setting of image compression and so on, is shown in FIG. 12. As an example when the size of image to be photographed is decided on the display screen, the setting for size of image in the digital camera 21 is changed by accepting the revised information by means of the WWW server function of the digital camera 21, an HTML document with the monitored image in the specified image size is transferred to the personal computer 26 having the WWW browser function in a predetermined frame rate. As described above the operator of the digital camera 21 is made it possible to select the size of image in relation to the baud rate according to the network system such that a larger monitored image (see FIG. 10) is selected to show the image when the baud rate is large or a smaller monitored image (see FIG. 11) is selected to show the image when the baud rate is small.

Furthermore, the image compression rate is made it possible to be selected from "Fine", "Normal", "Economy" and so on in a setting screen to select the image compression rate according to the baud rate as well as the above described selection for the size of image.

Further at the same time as well as the above described the size of image and the image compression rate, a time interval of transferring the monitored image (frame rate) is also made it possible to be selected such as from 1 time per second to N times per second such that a more frequent revised monitored image can be transferred to show the image which is much similar to a motion picture when the baud rate is large or a less frequent revised monitored image can be transferred to show the image which resembles to single frame stepped picture when the baud rate is small.

In this embodiment of the present invention it is possible to arrange an "Auto Mode" for selecting size of monitored image and the time interval of transferring monitored images (frame rate). By this arrangement as one example an appropriate parameters for communication is selected according to a kind of driver for the communication I/F which is booted up to utilize in the communication by means that the analog modem, the TA, the LAN (Broad Band) and so on is selected by the operator according to the communication method or they are selected automatically according to a state of line implementation in the "Auto Mode".

Figure 13:
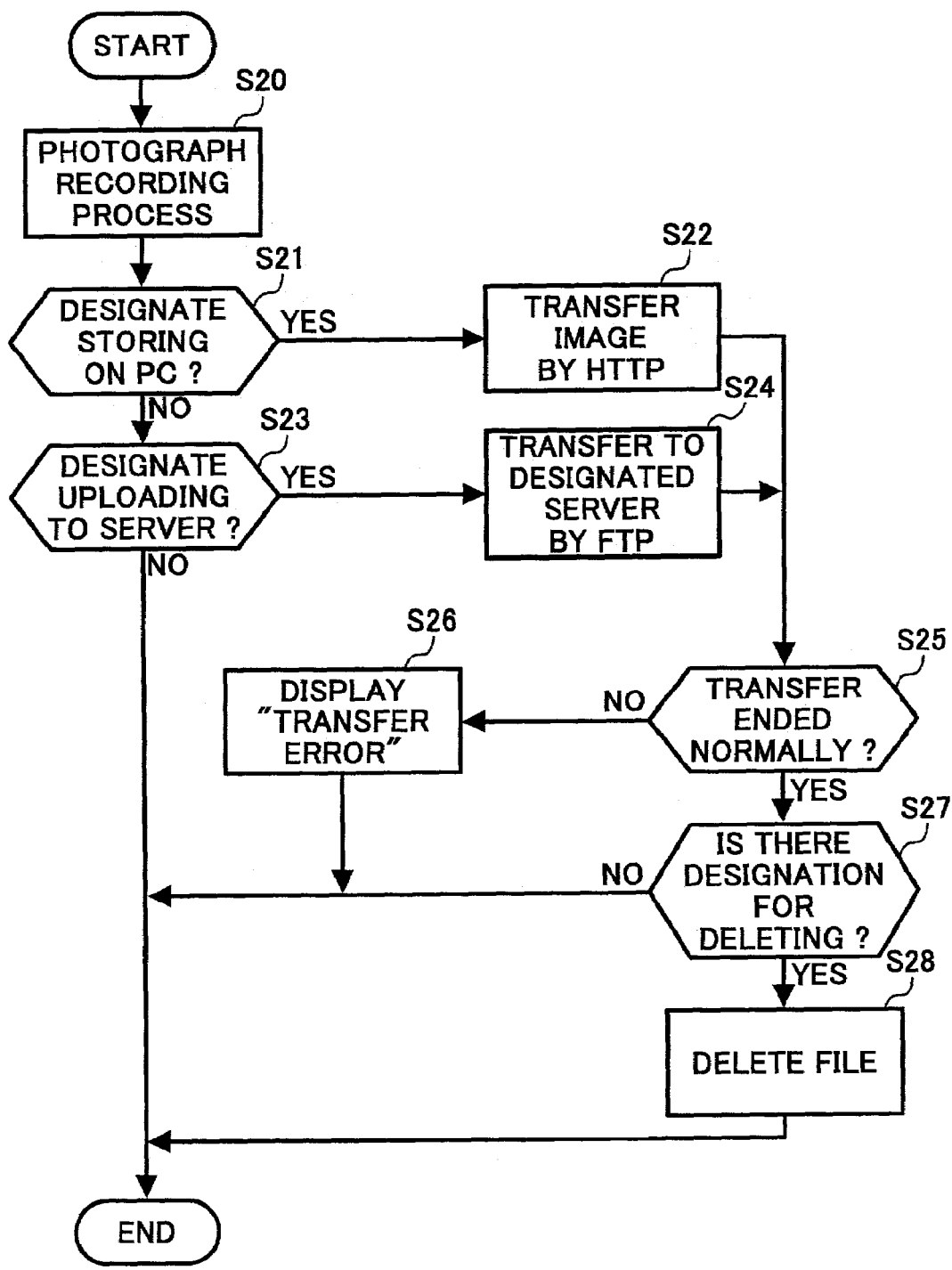
FIG. 13 is a flow chart to show a transferring process of the image data after a picture of the image is taken and a deleting process of the image data after the image data are transferred in accordance with the present invention.

FIG. 13 is a flow chart to show a transferring process of the image data after the image is photographed and a deleting process of the image data after the image data are transferred in accordance with the embodiment of present invention. After a recording process which is set in the digital camera 21 for the photographed image data is performed (S20), a confirmation whether a designation to store the image data in the personal computer 26 is set or not is achieved and when the designation is set (the result is "Yes" at S21), and the image data are transferred to a file folder in the designated personal computer 26 by means of protocol such as the http and so on (S22). Or when the designation is not set to the personal computer 26 (the result is "No" at S21), a confirmation whether an uploading to a file server is set or not is achieved and when the uploading to the file server is set (the result is "Yes" at S23), and the image data are transferred to the designated file server by means of protocol such as the ftp and so on (S24). Further when the uploading to the file server is not set (the result is "No" at S23), the transfer of image data is completed.

Moreover after the transfer process is completed in accordance with the above described settings, a confirmation whether the transfer is ended normally or not is achieved (S25), when in case the transfer is not ended normally (the result is "No" at S25), a fact that the transfer process has not been completed, is displayed on the digital camera 21 as "Transfer Error" or it is informed to the personal computer 26 (S26) and at the same time the process flow is ready to accept the next direction from the operator. At this point it may be also applicable that after several times of trial for transferring the image data again is repeated for a predetermined times the "Transfer Error" is displayed.

When the transfer is completed in normal (the result is "Yes" at S25), a confirmation whether the designation of a deleting of transferred image data is set when the transfer is normally completed or not is achieved (S27). When the designation is set (the result is "Yes" at S27), the deleting of image data designated by the setting is performed (S28) and the process flow is ended. Or when the designation is not set (the result is "No" at S27) the process flow is ended without deleting process of the image data.

By this arrangement it is made possible to reserve a sufficient free space in the memory means equipped on the digital camera 21 so that the image data with much higher picture quality which requires more memory capacity can be obtained.

As above described in accordance with the present invention the digital camera can be operated from remote location by the WWW browser function in the personal computer by the arrangement of furnishing the WWW server function on the digital camera. And at the same time a cooperation work between operators of the digital camera and the personal computer can be realized by the arrangement that a simultaneous operation by the operators is enabled. The image data monitored by the digital camera can be transferred to the other electronic apparatus (such as personal computer, PDA and so on) which are connected with the digital camera through the network and the transferred image data can be confirmed on the other electronic apparatus. The transfer of monitored image data can be performed in adequate condition according to a communication status of the network to be utilized. The web environment with a network connection between the digital camera and the apparatus of personal computers can be utilized for a communication between the operators of the above described apparatus with each other. Further by the arrangement that the photographed image data are deleted after the transfer of data to the designated destination are completed, it is made possible to reserve a sufficient free space in the memory means equipped on the digital camera so that the image data with much higher picture quality which requires more memory capacity can be obtained. The present invention brings about the effects described above.

Although the invention has been described in its preferred form with a certain degree of particularity, obviously many changes and variations are possible therein. It is therefore to be understood that the present invention may be practiced otherwise than as specified herein without departing from the scope and spirit thereof.

What is claimed is:

1. A control system for a digital camera, comprising:
   a digital camera including
      a photographing device configured to photograph an object to obtain image data,
      a display unit configured to display said image data,
      an image processor configured to respectively record/reproduce the image data to/from a recording medium, and compress/decompress said image data,
      a communication device configured to be connected to a network, and
      a controller configured to control said photographing device, said display unit, said image processor and said communication device; and
   a computing apparatus having a WWW browser function, said computing apparatus configured to be connected to said digital camera through said network,
   wherein a WWW server function is provided on said digital camera and configured to perform a communication between said digital camera and said computing apparatus through said communication device,
   wherein said controller is configured to enable, according to directions for operation from at least one of an operating unit provided on said digital camera and the WWW browser function of said computing apparatus, operation of photographic, recording, reproducing and communication functions of said digital camera simultaneously from both of a digital camera side comprising said digital camera and a computing apparatus side comprising said computing apparatus, whereby an operator of said computing apparatus is able to operate said digital camera even when an operator of said digital camera is using said digital camera and vice versa, and
   wherein, while either a setting mode operation by the operating unit of said digital camera side or a setting mode operation by said WWW browser function of the computing apparatus side is being executed, said controller is configured to carry out a control of an exclusive process adapted to prohibit the operation by the other side.

2. The control system for digital camera according to claim 1, wherein an operation of said digital camera is controlled by other digital cameras having a WWW browser function or a hand held terminal apparatus having a WWW browser function.

3. The control system for digital camera according to claim 1, wherein a state of an operating process by said digital camera is reflected to said computing apparatus and/or a state of an operating process by said computing apparatus is reflected to said digital camera.

4. The control system for digital camera according to claim 1, wherein a format of HTML document which includes photographed image data, a thumbnail of said image data, data setting of said digital camera and control data of the digital camera, is used as a format of a signal transferred between said digital camera and said computing apparatus in the communication between said digital camera and said computing apparatus.

5. The control system for digital camera according to claim 1, wherein data of a monitored image of the object to be photographed before a picture is taken by the digital camera are transferred with a predetermined size of the image and a predetermined frame rate by said WWW server function, and said monitored image data are received in said computing apparatus by said WWW browser function.

6. The control system for digital camera according to claim 5, wherein the size of the image, an image compression rate and/or the frame rate of the monitored image when the monitored image data are transferred, are made possible to change from said computing apparatus side by said WWW browser function.

7. The control system for digital camera according to claim 6, wherein the size of the image, the image compression rate and/or the frame rate of the monitored image when the monitored image data are transferred, are made possible to change according to a communication state of said network to connect between the digital camera and the computing apparatus.

8. The control system for digital camera according to claim 1, wherein the image data photographed by said digital camera are deleted from the recording medium, in which said image data are stored, after said photographed image data are transferred through the communication device to a predetermined destination to be stored and the transferring process has been completed normally.

9. The control system for digital camera according to claim 1, wherein a character data communication or an audio data communication is made possible between the operator of said digital camera side and the operator of said computing apparatus side both of which are connected with said network.

10. The control system of claim 1, wherein, when the exclusive process is carried out, the controller is configured to supply an error signal to the computing apparatus which has requested the operation to inform that the operation is not accepted by the exclusive process, and configured to supply the error signal to the display unit of the digital camera which has requested the operation to inform that the operation is not accepted by the exclusive process.

11. The control system of claim 1, wherein, when setting the setting mode operation for the digital camera is changed by the operation from the digital camera or the computing apparatus and the operation from the other side is not accepted by the exclusive process, the controller is configured to display changed contents of the setting on at least one of a display screen of the computer apparatus and the display unit of the digital camera.

12. A control method for digital camera system, comprising:
   preparing a digital camera, said digital camera including
      a photographing device configured to photograph object to obtain image data,
      a display unit configured to display said image data, an image processor configured to respectively record/reproduce the image data to/from a recording medium, and compress/decompress said image data, a communication device configured to be connected to a network, and a controller configured to control said photographing device, said display unit, said image processor and said communication device;

connecting a computing apparatus having a WWW browser function to said digital camera through said network;

providing a WWW server function on said digital camera;

performing a communication between said digital camera and said computing apparatus through said WWW server function;

using the controller to enable operation of photographing, recording, reproducing and communicating functions of said digital camera simultaneously from both of a digital camera side comprising said digital camera and a computing apparatus side comprising said computing apparatus, according to directions for operation by at least one of an operating unit provided on said digital camera and the WWW browser function of said computing apparatus, whereby an operator of said computing apparatus is able to use said digital camera at the same time as an operator of said digital camera and vice versa; and carrying out, while either a setting mode operation by the operation unit of said digital camera side or a setting mode, operation by said WWW browser function of the computing apparatus side is being executed, a control of an exclusive process adapted to prohibit the operation by the other side by said controller.

13. The control method for digital camera system according to claim 12, wherein a state of an operating process by said digital camera is reflected to said computing apparatus and/or a state of an operating process by said computing apparatus is reflected to said digital camera.

14. The control method for digital camera system according to claim 12, wherein a format of HTML document which includes photographed image data, a thumbnail of said image data, data setting of said digital camera and control data of the digital camera, is used as a format of a signal transferred between said digital camera and said computing apparatus in the communication between said digital camera and said computing apparatus.

15. The control method for digital camera system according to claim 12, wherein data of a monitored image of the object to be photographed before a picture is taken by the digital camera are transferred with a predetermined size of the image and a predetermined frame rate by said WWW server function, and said monitored image data are received in said computing apparatus by said WWW browser function.

16. The control method for digital camera system according to claim 15, wherein the size of the image, an image compression rate and/or the frame rate of the monitored image when the monitored image data are transferred, are made possible to change from said computing apparatus side by said WWW browser function.

17. The control method for digital camera system according to claim 16, wherein the size of the image, the image compression rate and/or the frame rate of the monitored image when the monitored image data are transferred, are made possible to change according to a communication state of said network.

18. The control method for digital camera system according to claim 12, wherein the image data photographed by said digital camera are deleted from the recording medium, in which said image data are stored, after said photographed image data are transferred through the communication device to a predetermined destination to be stored and the transferring process has been completed normally.

19. The control method for digital camera system according to claim 12, wherein a character data communication or an audio data communication is made possible between the operator of said digital camera side and the operator of said computing apparatus side both of which are connected with said network.

20. The control method of claim 12, further comprising:
supplying an error signal to the computing apparatus which has requested the operation to inform that the operation is not accepted by the exclusive process when the exclusive process is carried out; and
supplying the error signal to the display unit of the digital camera which has requested the operation to inform that the operation is not accepted by the exclusive process when the exclusive process is carried out.

21. The control method of claim 12, further comprising, when setting in the setting mode operation for the digital camera is changed by the operation from the digital camera or the computer apparatus and the operation from the other side is not accepted by the exclusive process, displaying changed contents of the setting on at least one of a display screen of the computing apparatus and the display unit of the digital camera.

22. A control system for a digital camera, comprising:
a digital camera including
a photographing device configured to photograph an object to obtain image data,
a display unit configured to display said image data,
an image processor configured to respectively record/reproduce the image data to/from a recording medium, and compress/decompress said image data,
a communication device configured to be connected to a network, and
a controller configured to control said photographing device, said display unit, said image processor and said communication device; and
a computing apparatus having a WWW browser function, said computing apparatus configured to be connected to said digital camera through said network, wherein
a WWW server function is provided on said digital camera and configured to perform a communication between said digital camera and said computing apparatus through said communication device,
wherein said controller enables, according to directions for operation from at least one of an operating unit provided on said digital camera and the WWW browser function of said computing apparatus, operation of photographic, recording, reproducing and communication functions of said digital camera simultaneously from both of a digital camera side comprising said digital camera and a computing apparatus side comprising said computing apparatus, whereby an operator of said computing apparatus is able to operate said digital camera even when an operator of said digital camera is using said digital camera and vice versa, and
wherein, while either a process which requires continuous operation of the operating unit of the digital camera by said digital camera side or a process which requires continuous operation of an operating unit of the computing apparatus by the computing apparatus side is being executed, said controller is configured to carryout a control of an exclusive process adapted to prohibit the operation by the other side.

23. The control system of claim 22, wherein, when the exclusive process is carried out, the controller is configured to supply an error signal to the computing apparatus which has requested the operation to inform that operation is not accepted by the exclusive process, and configured to supply the error signal to the display unit of the digital camera which has requested the operation to inform that the operation is not accepted by the exclusive process.

24. The control system of claim 22, wherein, when setting in the setting mode operation for the digital camera is changed by the operation from the digital camera or the computing apparatus and the operation from the other side is not accepted by the exclusive process, the controller is configured to display changed contents of the setting on at least one of a display screen of the computing apparatus and the display unit of the digital camera.

25. A control method for digital camera system, comprising:
 preparing a digital camera, said digital camera including
  a photographing device configured to display said image data,
  an image processor configured to respectively record/reproduce the image data to/from a recording medium, and compress/decompress said image data,
  a communication device configure to be connected to a network, and
  a controller configured to control said photographing device, said display unit, said image processor and said communication device;
 connecting a computer apparatus having a WWW browser function to said digital camera through said network;
 providing a WWW server function on said digital camera;
 performing a communication between said digital camera and said computer apparatus through said WWW server function;
 using the controller to enable operation of photographing, recording, reproducing and communicating functions of said digital camera, simultaneously from both of a digital camera side comprising said digital camera and a computing apparatus side comprising the computing apparatus, according to directions for operation by at least one of an operating unit provided on said digital camera and the WWW browser function of said computing apparatus, whereby an operator of said computing apparatus is able to use said digital camera at the same time as an operator of said digital camera and vice versa; and
 carrying out, while either a process which requires continuous operation of the operating unit of the digital camera by said digital camera side or a process which requires continuous operation of an operating unit of the computing apparatus by the computing apparatus side is being executed, a control of an exclusive process adapted to prohibit the operation by the other side by said controller.

26. The control method of claim 25, further comprising:
 supplying an error signal to the computing apparatus which has requested the operation to inform that the operation is not accepted by the exclusive process when the exclusive process is carried out;
 supplying the error signal to the display unit of the digital camera which has requested the operation to inform that the operation is not accepted by the exclusive process when the exclusive process is carried out.

27. The control method of claim 25, further comprising, when setting in the setting mode operation for the digital camera is changed by the operation from the digital camera or the computing apparatus and the operation from the other side is not accepted by the exclusive process, displaying changed contents of the setting on at least one of a display screen of the computing apparatus and the display unit of the digital camera.

\* \* \* \* \*